Feb. 23, 1971  A. S. HUERTA  3,564,801
JOINT ELEMENT FOR SECURING PARTITIONS OR THE LIKE
Filed Nov. 15, 1968

INVENTOR
AMADO SANCHEZ HUERTA

BY *Jaeckle & Davidson*

ATTORNEYS

United States Patent Office 3,564,801
Patented Feb. 23, 1971

3,564,801
JOINT ELEMENT FOR SECURING PARTITIONS OR THE LIKE
Amado Sanchez Huerta, Edf. Aldabedi, Calle Internacional, Las Acacias, Caracas, Venezuela
Filed Nov. 15, 1968, Ser. No. 776,205
Int. Cl. E04c *1/10, 2/20*
U.S. Cl. 52—580                                                     3 Claims

ABSTRACT OF THE DISCLOSURE

A joint element for securing partitions or the like to each other wherein male and female mating means are provided for each edge of a partition with the male and female mating means being universal and including all right angular corners to insure good joining between the partitions. The joint provides a tortuous path to minimize temperature equalization on opposite sides of the partition. The joints are particularly useful in partitions for refrigerated compartments and the like which include facing members and a filling of insulating material.

---

Figure 1:
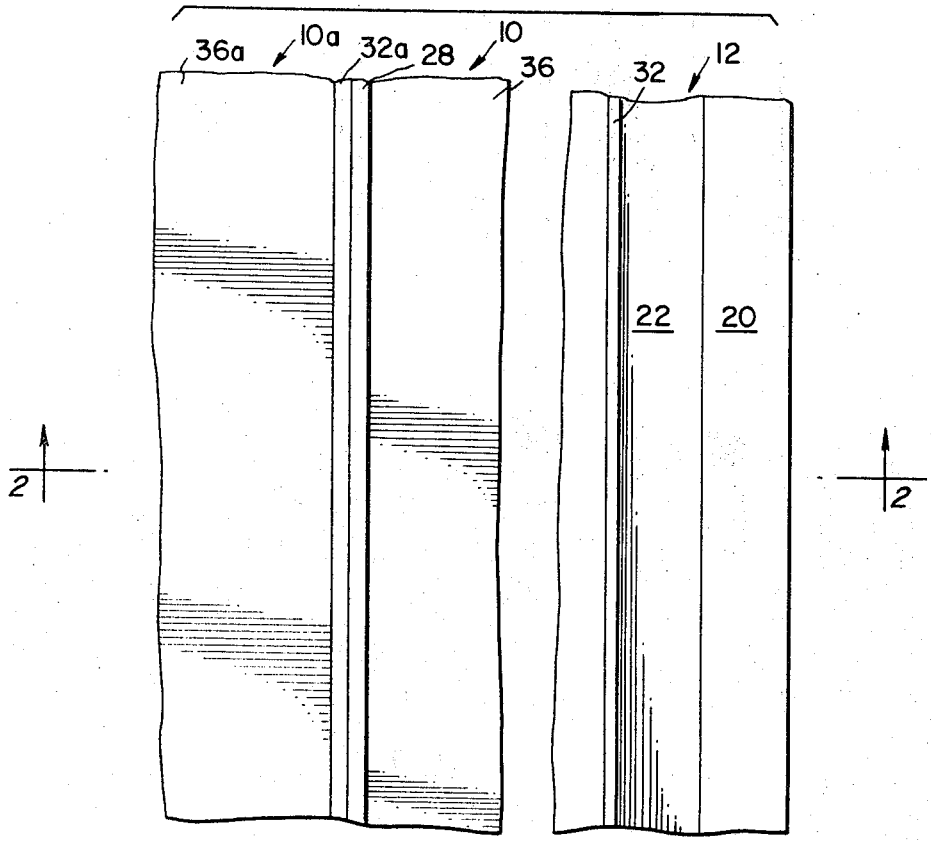

This invention relates to a joint element and relates more particularly to a joint element useful for securing partitions, panels or the like to each other.

According to the prior art the joining of partitions or the like requires the use of a large number of fastening members such as hooks, screws, nails, clamps, etc. In some instances such means provide a sufficient engagement between the partitions but in other cases, particularly where an hermetic joint is necessary, such prior art fastening means are not adequate.

Hermetically sealed joints are required, for example, in refrigerated containers wherein it is important to preclude leakage to the outside of the low temperature prevailing inside and, similarly, to preclude leakage to the inside of the warmer temperatures prevailing outside. At the present, partitions or modules for refrigerator containers utilize wood carried by the panels secured together relatively tightly due to the tensile strength provided by graduated iron hooks from the outside by means of hexagonal bolts. While this technique is an improvement over previous constructions, nevertheless, at the junction between the modules visible condensation materializes in the form of droplets known to the trade as container perspiration. This perspiration results from the fact that the lower temperature existing within the container has an easy passage to the outside moistening the flanges of the modules which, as have already been noted, are generally made of wood. In other words, the extreme portions of the profile have a short life expectancy.

It is a primary object of the instant invention to provide a joint element for securing panels or partitions to each other which overcomes the foregoing and other such disadvantages, particularly, when utilized as an hermetic seal, which precludes container perspiration.

Yet another object of the instant invention is the provision of a sealing means of the type described which is universal in that the same joint element can be utilized on opposite sides of a given panel and will cooperate with similar joint elements on other panels without the need for nails, hooks, screws or other such fastening means.

Still another object of the instant invention is the provision of a joint element having a multitude of right angles in a configuration with no curved lines in the profile again permitting use on opposite sides of a module or partition and, additionally, providing a tortuous path over the full length of the seam or joint whereby heat transfer is minimized.

An additional object of the instant invention is to provide a joint element which is simple and inexpensive to manufacture, being extruded from plastic if desired, while highly reliable in use.

Figure 2:
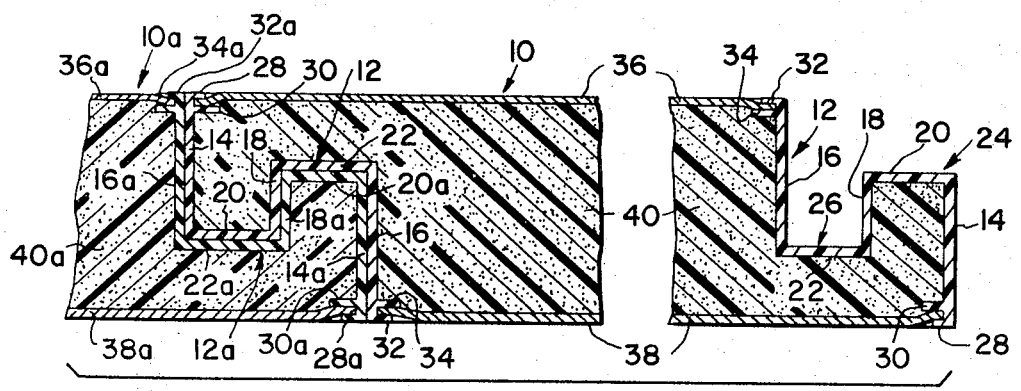

Other and further objects reside in the combination of elements, arrangement of parts and features of construction. Still other objects in part will be obvious and in part be pointed out as the description of the invention proceeds, and as shown in the accompanying drawing wherein:

FIG. 1 is a fragmentary elevational view of portions of two panels secured together, partly broken away for illustrative convenience; and FIG. 2 is a transverse cross-sectional view taken substantially on lines 2—2 of FIG. 1.

Like reference characters refer to like parts throughout the several views of the drawing.

Referring now to the drawing, portions of two partitions, panels or modules are designated generally by the reference numerals 10, 10a, respectively. The partition 10a is identical with the partition 10 and parts thereof similar to parts of the partition 10 will be designated by the same reference numeral followed by the suffix "a."

Each of the partitions includes a joint element according to the instant inventive concepts, designated generally by the reference numeral 12, secured along its lateral edges. A pair of such joint elements 12 have been shown associated with the partition 10 and only one of the joint elements 12a has been shown associated with the partition 10a for illustrative convenience.

Each of the joint elements comprise outer and inner leg members 14, 16, respectively, these leg elements being of substantially the same length, but offset with respect to each other as will be seen particularly in FIG. 2. An intermediate leg member 18 is positioned between the outer and inner leg members 14, 16 and is parallel to such outer and inner leg members. The outer and inner leg members 14, 16 are approximately two-thirds of the thickness of the entire partition 10 and the intermediate leg member 18 is approximately one-third of the thickness of the entire partition 10. Connecting members 20, 22 exend perpendicularly to all of the leg members with the connecting member 20 connecting one end portion of the intermediate leg member 18 with an aligned end portion of the outer leg member 14 to thereby define a male mating means designated generally by the reference numeral 24, and the other connecting member 22 connects the other end of the intermediate leg member 18 with an aligned end of the inner leg member 16 to thereby define a female mating means designated generally by the reference numeral 26. As will be seen particularly from FIG. 2 the male mating means 24 is a generally convex U-shaped means and the female mating means 26 is a generally concave U-shaped means.

As will be seen from the drawing the male mating means 24 of one joint element is dimensioned to cooperate with the female mating means 26 of a joint element on an adjacent partition. In this manner partitions can be secured together hermetically providing a tortuous path along the seam or joint without the need for nails, screws, clamps, hooks, or other such fastening means. Additionally, it will be seen that the joint elements are universal in that they can be utilized on either side of a particular partition or panel although the male and female mating, means of the joint elements on opposite edges of an individual partition should be disposed in opposite directions to facilitate engagement of one partition or panel with the next.

At the free end portions of the outer and inner leg members 14, 16 respectively a pair of slightly spaced flange members 28, 30 and 32, 34 are provided, these flange members extending perpendicularly from their respective leg members. The flange members 28, 30 on the outer leg member 14 extend toward the intermediate leg member 18 and the flange members 32, 34 on the inner leg member 16 extend away from the intermediate leg member 18 so that these flange members may be utilized for receiving and securely holding opposite edge portions of facing elements 36, 38 disposed on opposite surfaces of partition 10. The space between the facing elements 36, 38 and the joint members 12 is filled with an insulating material 40 to improve the properties of the partition 10 for use in a refrigerated container or the like.

The various portions of a partition according to the instant inventive concept can be manufactured of any suitable material and in any suitable size. Obviously, the size depends only on the dimensions of the final product to be fabricated from the partitions. The joint members 12 are advantageously extruded plastic elements of a length sufficient to extend along the full edge of a given partition. The facing elements 36, 38 can be formed of plastic or metal with their edge portions bent to engage in the flange members 28, 30 and 32, 34. The insulated material can be a foamed plastic of any type or even foam rubber or the like. The use of plastic materials, either thermoplastic or thermosetting, is desirable in the manufacture of partitions according to the instant inventive concepts due to the known poor heat conductivity of such materials as well as their good mechanical properties and their ability to withstand pressure. Additionally, such materials, if desired, can have a slight resiliency to even further improve engagement between the male and female mating means.

It is now believed that the use and construction of the joint elements and partitions of the instant inventive concept will be readily apparent to those with ordinary skill in the art.

What is claimed is:

1. A joint element for securing partitions or the like to each other, said joint element comprising parallel outer and inner leg members of substantially the same length, but offset with respect to each other, each of said outer and inner members having a free end portion and an opposite end portion, an intermediate leg member parallel to said outer and inner leg members and positioned between the same, said intermediate leg member being shorter than said outer and inner leg members and having one end portion aligned with said opposite end portion of said outer leg member and its other end portion aligned with said opposite end portion of said inner leg member, and a pair of connecting members of substantially the same length extending perpendicularly to all of said leg members, one of said connecting members connecting said one end portion of said intermediate leg member with said aligned opposite end portion of said outer leg member, and the other of said connecting members connecting said other end portion of said intermediate leg member with said aligned opposite end portion of said inner leg member, whereby said intermediate leg member is connected to said outer leg member to form a male mating means and said intermediate member is connected to said inner leg member to form a female mating means, male and female mating means of a joint element carried by one partition or the like cooperating engaging female and male mating means, respectively, of a joint element carried by another partition or the like to secure the partitions to each other, said respective joint elements when so engaged defining therebetween a tortuous path forming a hermetic seal, said joint element further including a pair of slightly spaced flange members extending perpendicularly from said free end portions of each of said outer and inner leg members for reception between each pair of flange members of facing elements forming part of a partition or the like, said flange members connected to said free end portion of said outer leg member extending toward said intermediate leg member and said flange members connected to said free end portion of said inner leg member extending away from said intermediate leg member.

2. A partition or the like comprising a pair of joint elements according to claim 1, said joint elements being spaced from each other with said flange members of said joint elements extending toward each other and with said male and female mating means of said joint elements being oppositely disposed, a pair of facing elements each having opposite edge portions, said edge portions of each of said facing elements being secured between said flange members connected to the outer leg member of one joint element and said flange members connected to the inner leg member of the other joint element.

3. The partition or the like of claim 2 further including an insulating material filling the space defined between said facing elements and said joint elements.

References Cited

UNITED STATES PATENTS

| 637,212 | 11/1899 | McCune | 289—20.92TG |
| 2,142,305 | 1/1939 | Davis | 52—601 |
| 2,950,786 | 8/1960 | Markle | 52—588 |
| 3,003,810 | 10/1961 | Kloote | 52—309 |
| 3,217,455 | 11/1965 | Burges | 52—404 |
| 3,364,645 | 1/1968 | Wenzelberger | 52—627X |
| 3,367,076 | 2/1968 | O'Brien | 52—309 |

JOHN E. MURTAGH, Primary Examiner

U.S. Cl. X.R.

52—309, 588, 593